(12) United States Patent
Opaluch (10) Patent No.: US 8,639,513 B2
(45) Date of Patent: Jan. 28, 2014

(54) AUTOMATED COMMUNICATION INTEGRATOR

(75) Inventor: Robert Edward Opaluch, Riverside, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 703 days.

(21) Appl. No.: 12/535,818

(22) Filed: Aug. 5, 2009

(65) Prior Publication Data

US 2011/0035220 A1  Feb. 10, 2011

(51) Int. Cl.
| | |
|---|---|
| G10L 21/00 | (2013.01) |
| G10L 19/00 | (2013.01) |
| G10L 15/06 | (2013.01) |
| G10L 17/00 | (2013.01) |
| G10L 11/00 | (2006.01) |
| G10L 15/26 | (2006.01) |

(52) U.S. Cl.
USPC ........ 704/270; 704/270.1; 704/275; 704/201; 704/243; 704/246; 704/278; 704/235

(58) Field of Classification Search
USPC .............. 704/270, 275, 201, 246, 270.1, 278, 704/235, 243
See application file for complete search history.

(56) References Cited

U.S. PATENT DOCUMENTS

| | | | | |
|---|---|---|---|---|
| 6,557,026 B1 * | 4/2003 | Stephens, Jr. | ................. | 709/203 |
| 6,603,838 B1 * | 8/2003 | Brown et al. | .............. | 379/88.22 |
| 6,707,891 B1 * | 3/2004 | Guedalia | .................... | 379/88.17 |
| 7,460,652 B2 * | 12/2008 | Chang | ........................ | 379/88.18 |
| 7,483,834 B2 * | 1/2009 | Naimpally et al. | ........ | 704/270.1 |
| 7,925,510 B2 * | 4/2011 | Creamer et al. | ........... | 704/270.1 |
| 8,019,324 B2 * | 9/2011 | Roth et al. | ................. | 455/414.1 |
| 8,041,576 B2 * | 10/2011 | Kuboyama | .................... | 704/275 |
| 2003/0163321 A1 * | 8/2003 | Mault | ........................... | 704/270 |
| 2003/0214942 A1 * | 11/2003 | Ali et al. | ....................... | 370/352 |
| 2007/0112571 A1 * | 5/2007 | Thirugnana | .................... | 704/270 |
| 2007/0165818 A1 * | 7/2007 | Savoor et al. | ............ | 379/201.12 |

* cited by examiner

*Primary Examiner* — Edgar Guerra-Erazo (57) ABSTRACT

An apparatus includes a plurality of applications and an integrator having a voice recognition module configured to identify at least one voice command from a user. The integrator is configured to integrate information from a remote source into at least one of the plurality of applications based on the identified voice command. A method includes analyzing speech from a first user of a first mobile device having a plurality of applications, identifying a voice command based on the analyzed speech using a voice recognition module, and incorporating information from the remote source into at least one of a plurality of applications based on the identified voice command.

23 Claims, 3 Drawing Sheets

AUTOMATED COMMUNICATION INTEGRATOR

BACKGROUND

Mobile devices, such as cellular telephones or so-called smart devices, often include multiple applications such as an address book, calendar, task list, and even email that can be accessed at the same time. However, many users find it difficult or inconvenient to use even two applications simultaneously. For example, it is often annoying to be asked to update data in one application while otherwise working with another application. Additionally it is often unwise to update data in an application when otherwise preoccupied (e.g., a user is asked being asked to provide data in a calendar, address book, task list, etc. while driving). Accordingly, a system that is able to integrate information into an application while otherwise working with another application or being otherwise preoccupied without significant inconvenience to a user is needed.

DETAILED DESCRIPTION

An exemplary apparatus includes a plurality of applications and an integrator that is configured to identify at least one command from a user and integrate information from a remote source into at least one of the plurality of applications based on the identified command. The command may come from a voice command, button, gesture, etc. initiated by the user. For example, using voice commands, the user is able to integrate information from the remote source into one or more applications without significant inconvenience. Accordingly, the user is able to update contact information in an address book, schedule appointments, create/edit tasks in a task list, review electronic text and voice messages, etc. from the remote source using voice commands. As discussed in greater detail below, the remote sources may include another person, another mobile device, a remote database, a personal computer, a website, etc.

Figure 1:
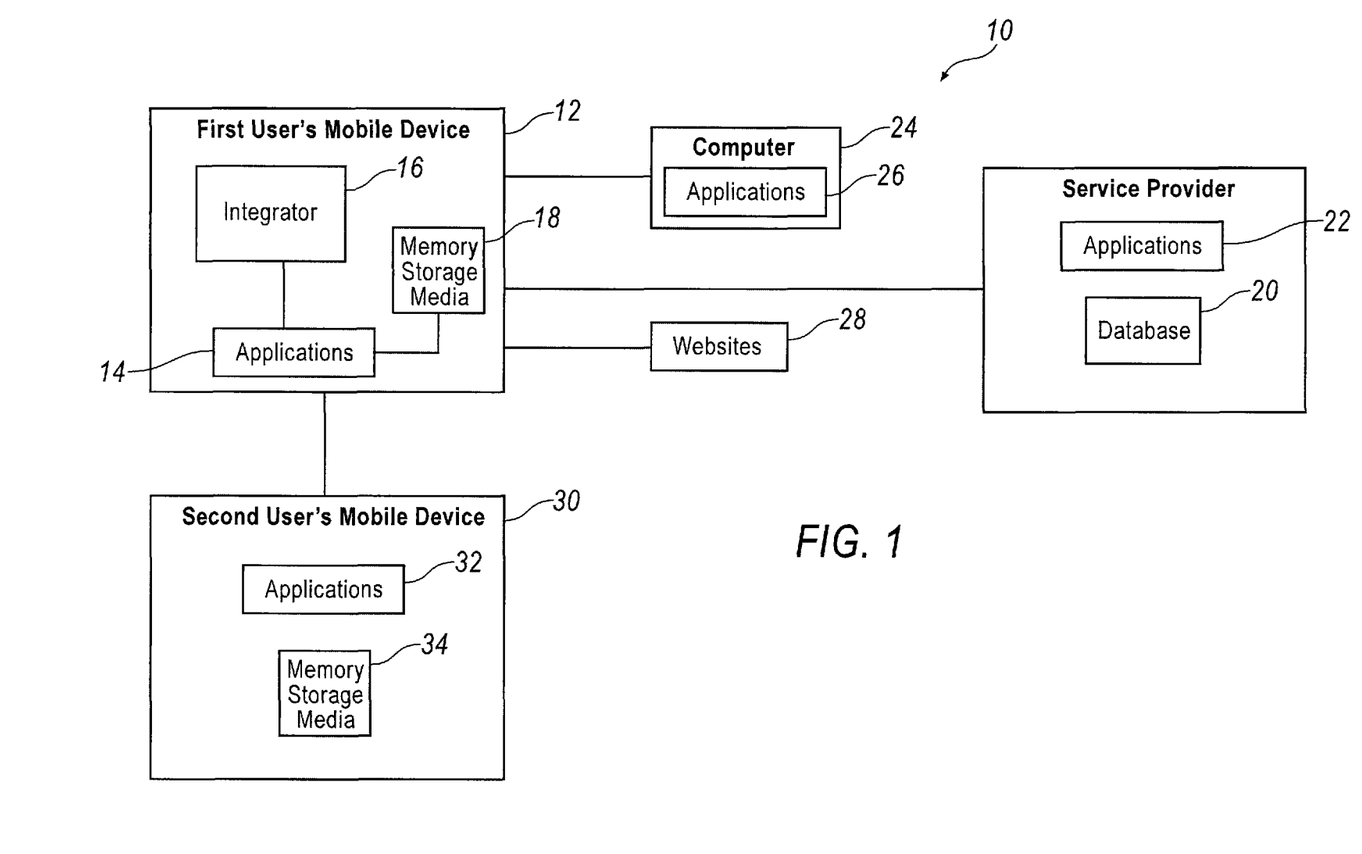
FIG. 1 illustrates an exemplary system including a mobile device having an integrator.

FIG. 1 illustrates an exemplary system 10 that includes a mobile device 12, such as a cellular telephone, personal digital assistant, or any other device capable of processing information as described herein. The mobile device 12 includes one or more applications 14 configured to be executed by the mobile device 12. In one exemplary approach, the mobile device 12 includes an integrator 16 in communication with one or more of the applications 14. The integrator 16 is configured to identify a voice command from a user, and based on the voice command, the integrator 16 inputs information from one or more remote sources into one or more of the applications 14.

The mobile device 12 may include any number of applications 14. For example, the mobile device 12 may include an email application, a calendar application, a global positioning system (GPS) application, a text messaging application, an address book application, a navigator application, a voice messaging application, a telephone application, a web browser, and a task list application. However, this list is not meant to be limiting or exhaustive. Each application 14 may store information in the one or more memory storage media 18 in the mobile device 12. For example, one of the memory storage media 18 may store appointments for the calendar application, while the same or another memory storage media 18 may store contact information for the address book application. The integrator 16 is configured to access information from each of the memory storage media 18, as well as copy information stored for one application to another application. For example, the integrator 16 may be configured to access an appointment in the calendar and update the appointment to include contact information stored in the address book application. Other exemplary functions performed by the integrator 16 will be explained in more detail below.

A service provider may host a remote database 20 in communication with and storing information relating to one or more remote applications 22 that are also hosted by the service provider. For example, the service provider may host an email application, a calendar, an address book, etc. for the user. The mobile device 12 may be configured to access the remote database 20 through a network, such as the Internet or a mobile network.

A personal computer 24 may include one or more applications 26 having information that may be accessed by the mobile device 12 through a wired or wireless connection. The personal computer 24 may be a desktop computer, a laptop computer, a netbook, or any other computing device capable of executing software as described herein.

A website 28 may store information as text or computer-readable code, such as HTML, Java, Flash, etc. The website 28 may include information about events, such as dates, ticket availability, ticket prices, and locations. Other information may be stored on the website 28, such as information about business or people, including names, addresses, telephone numbers, email addresses, etc.

A second mobile device 30 operated by a second user may store information associated with one or more applications 32 in one or more memory storage media 34. The second mobile device 30 may include a cellular telephone, personal digital assistant, or any other device capable of processing information as described herein.

The mobile device 12 may be in communication with the remote database 20, the computer 24, the website 28, and/or the second mobile device 30 via a wired or wireless connection. For example, the system 10 may implement a Plain Old Telephone Service (POTS) telephone, Voice Over Internet Protocol (VOIP) telephone, mobile telephone, "softphone," pager, computer, Set Top Box (STB), etc. that is used by a subscriber to send and receive communications (such as voice, text, image, video, binary data, etc.) over a communications network (e.g., Public Switched Telephone Network (PSTN), VOIP, cellular telephone, etc.). The communications network may include multiple interconnected networks that provide communications services, including voice calling, packet-switched network services (including, for example, Internet access and/or VOIP communication services), as well as Short Message Service (SMS) messaging and Multimedia Messaging Service (MMS) messaging services, to at least one subscriber device.

In general, computing devices such as the first mobile device 12, the personal computer 24, or the second mobile device 30 may employ any of a number of well known computer operating systems, including, but by no means limited to, known versions and/or varieties of mobile operating systems, the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Mobile operating systems may include the Blackberry® operating system distributed by Research in Motion of Waterloo, Ontario, Canada, the Windows Mobile® operating system distributed by the Microsoft Corporation, the Android® operating system distributed by Google, Inc. of Mountain View, Calif., the operating system distributed by Palm, Inc. of Sunnyvale, Calif., or the operating system distributed by Apple Inc. of Cupertino, Calif. The mobile devices 12, 30 or the personal computer 24 may include any one of a number of well known computing devices, including, without limitation, a cellular telephone, personal digital assistant, a computer workstation, a desktop, notebook, laptop, or handheld computer, or some other known computing device as previously discussed.

The first and second mobile devices 12, 30, personal computer 24, and/or remote database 20 may include instructions executable by one or more computing devices such as those listed above. Computer-executable instructions may be compiled or interpreted from computer programs created using a variety of well known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted via wired or wireless communication by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the remote database 20, may include various kinds of mechanisms for storing, accessing, and retrieving various kinds of data, including a hierarchical database, a set of files in a file system, an application database in a proprietary format, a relational database management system (RDBMS), an object-oriented database, etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements and/or modules may be tangibly implemented as computer-readable instructions (e.g., software) on one or more computing devices (e.g., mobile device 12, 30, personal computer 24, remote database 20, etc.), and stored on computer readable media (e.g., memory storage media 18, 34, etc.) associated therewith (e.g., disks, memories, etc.).

Figure 2:
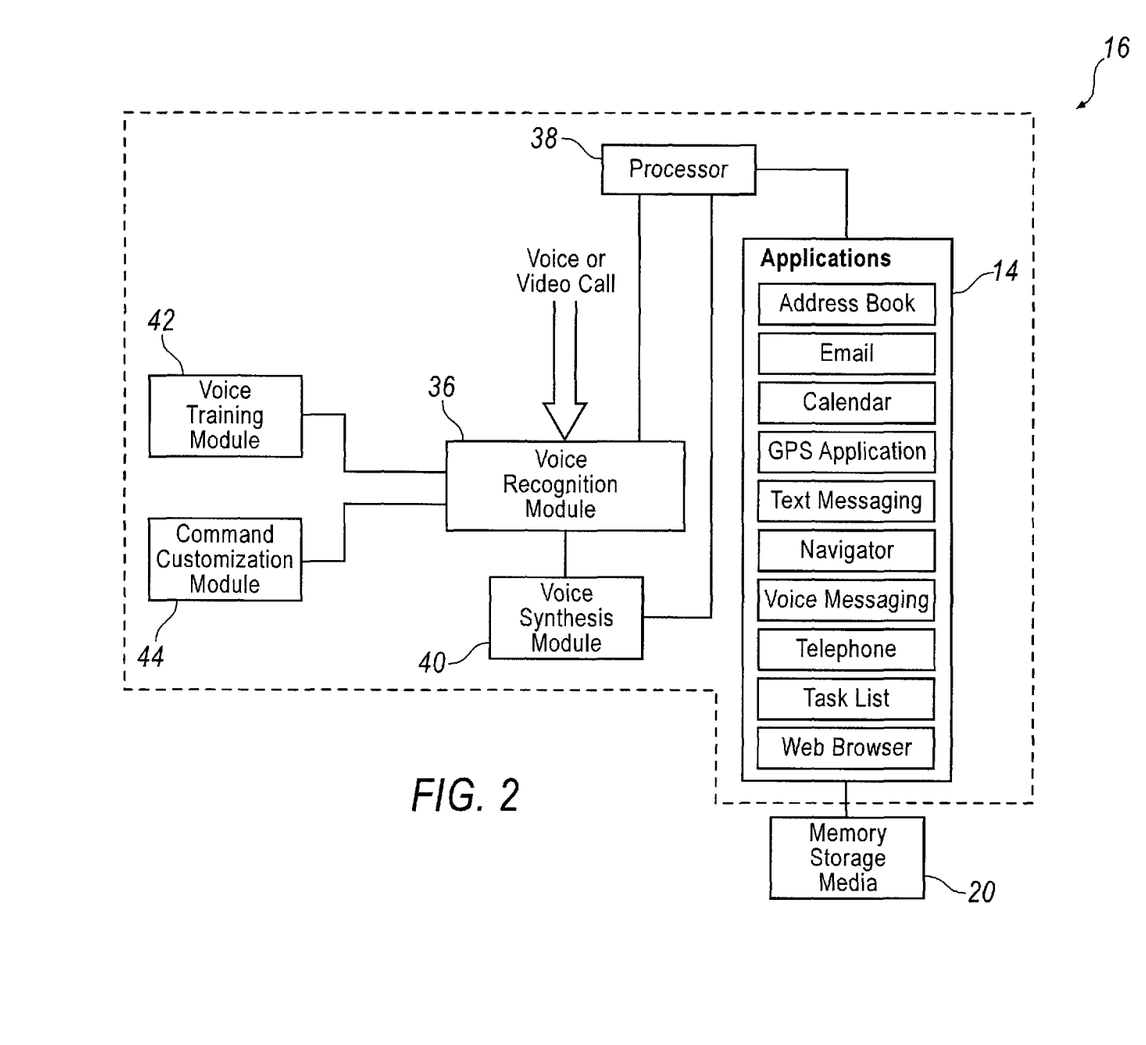
FIG. 2 illustrates an exemplary diagram of modules that may be implemented by the integrator.

FIG. 2 illustrates an exemplary diagram of modules that may be implemented by the integrator 16. The integrator 16 may include a voice recognition module 36 that analyzes the user's speech. The voice recognition module 36 may receive sound waves traveling through the air using, for example, a microphone. The voice recognition module 36 may be further configured to convert the sound waves to words using a speech-to-text application. In one illustrative approach, the voice recognition module 36 may continuously or at regular intervals listen for commands and execute the command when spoken by the user. Alternatively, the voice recognition module 36 may be enabled by a button on the mobile device 12, such as a push-to-record or push-to-talk button.

A processor 38 in communication with the voice recognition module 36, the remote database 20, the personal computer 24, and/or the second mobile device 30 may parse the text to identify voice commands or information from a remote source. The processor 38 may be configured to access predetermined rules stored in the one or more memory storage media 18, and identify information after applying the predetermined rules in response to a voice command received from the voice recognition module 36. For example, the voice command may indicate which of the predetermined rules to apply. The predetermined rules may list identifiers or indicators of information. For example, the predetermined rules may indicate that a string of 10 numbers in a row is a telephone number or that text surrounding a "@" symbol followed by a top level domain (e.g., ".com" or ".net") is part of an email address. Furthermore, the integrator 16 may identify an address or location by searching for text defined by the predetermined rules as being associated with known combinations of street names, cities, zip codes, and/or states with digits. The processor 38 may use these or any other identifiers listed in the predetermined rules to search for and identify information from remote sources. Accordingly, the predetermined rules may be used by the integrator 16 to identify voice commands, as well as addresses, calendar appointments, names, locations, etc., and input the identified information into one or more of the applications 14. The processor 38 may perform other functions, such as looking up contact information in the address book, adding/updating contact information, dialing telephone numbers, looking up appointments in the calendar, adding/updating appointments, etc. Moreover, the integrator 16 may include additional modules to perform these or other functions.

A voice synthesis module 40 may be in communication with the voice recognition module 36. The voice synthesis module 40 may be configured to convert text from one or more applications 14 to speech. For example, the voice synthesis module 40 may receive information from the processor 38 and convert the information into speech, giving the impression to the user that the integrator 16 is reading, for example, a list of appointments from the calendar, contact information from the address book, text messages, tasks, and/or emails, etc. in response to a voice command.

A voice training module 42 may be in communication with the voice recognition module 36. The voice training module 42 may be used by the user to train the voice recognition module 36 to understand specific commands, as well as enable flexible interaction with other sources of information including applications 14 and third parties, such as the user of the second mobile device 30.

A command customization module 44 may be included with the integrator 16 and may allow the user to customize the response of the integrator 16 to any of the voice commands spoken by the first user.

In one exemplary implementation, when enabled, the voice recognition module 36 may listen for speech and convert the speech to text once received. The processor 38 may then identify a voice command by analyzing the text and select the appropriate application 14 based on the voice command. Using the voice command, the processor 38 may access information from a remote source such as the remote database 20, the computer 24, the website 28, or the second mobile device 30. Further, the processor 38 may access the predetermined rules stored in the memory storage media 18. The processor 38 may use the predetermined rules to identify relevant information, and the processor 38 may integrate the relevant information from the remote source into the selected application 14. For example, the user may press the appropriate button or otherwise trigger the voice recognition module 36 to begin recording speech. The user may speak, "Let me put this in my appointment book" while on the phone with the second user, causing the voice recognition module 36 to record the first and second user's speech and convert the recorded speech into text. The processor 38 may analyze the text to determine whether the first user spoke a voice command or keyword. For instance, the processor 38 may recognize the words "appointment book" and open the calendar. The voice recognition module 36 continues to record speech and convert the speech to text even after the voice command has been identified. Because the voice command indicated that the calendar should be opened, the processor 38 applies the predetermined rules associated with identifying information relevant to calendar appointments, such as names, phone numbers, dates and addresses. With the relevant information, the processor 38 may create a new appointment in the user's calendar. The integrator 16 may be configured to stop performing these steps when the user speaks a command, such as "Done," or when the user stops talking for a predetermined amount of time.

In an alternative illustration, the user may not need to speak any commands once the button is pressed. For example, in response to the user pressing the button, the integrator 16, using the voice recognition module 36 and processor 38, may automatically scan a current or previously recorded conversation and extract important information, such as dates, times, phone numbers, names, spellings of names, addresses, and/or the conversation around this data. This important information may then be stored by the processor 38 in the one or more memory storage media 18 associated with one or more applications 14 based on the contents of the conversation. For example, identified names, addresses, and telephone numbers may be stored in the address book, while important dates may be stored as appointments in the calendar.

Besides telephone conversations, the integrator 16 may be used to analyze text messages, email, in-person conversations, or other situations. In particular, in response to a voice command by the user, the integrator 16 may be configured to scan, for example, the user's email application on the mobile device 12, or at a remote source, such as the remote database 20 or stored on the personal computer 24. Once scanned, the integrator 16 may identify names and contact information in emails by using the processor 38 to scan text and apply the predetermined rules indicated by the voice command. The processor 38 may then be configured to input that information into one or more applications 14, such as an address book. The integrator 16 may be configured to identify other information, such as dates, and place the contents of the email into a calendar appointment.

Figure 3:
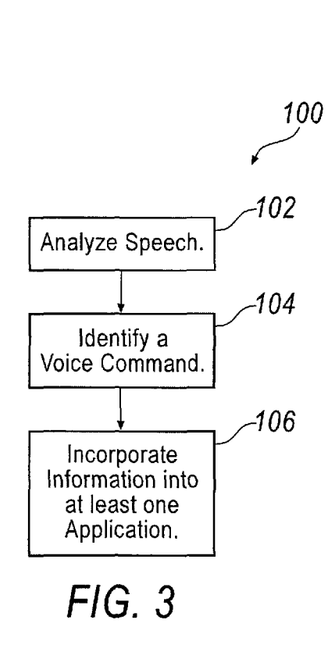
FIG. 3 illustrates an exemplary flowchart of a method executed by the integrator.

FIG. 3 illustrates an exemplary flowchart of a method 100 executed by the integrator 16. The method includes a step 102 of analyzing speech from the first user. For example, as previously discussed, the voice recognition module 36 may capture sounds and convert the sound to text using speech-to-text software. The method 100 may further include a step 104 of identifying a voice command. Step 104 may include parsing the text identified by the speech-to-text software for information using the processor 38. The processor 38 may use predetermined rules stored in a memory storage media 18 to determine if a predetermined voice command has been spoken, and if so, the text is parsed by the processor 38 for information in accordance with the command. For example, if the voice command indicates that the user needs to add a new appointment to the calendar, the processor 38 uses the predetermined rules associated with identifying dates, times, locations, etc. Alternatively, if the voice command indicates that the user is receiving updated contact information, the processor 38 accesses the predetermined rules relating to names, telephone numbers, postal addresses, email addresses, etc. Moreover, the method 100 may include a step 106 of incorporating information from a remote source into at least one of the first applications 14 based on the identified voice command. For example, once the information is identified by the processor 38, the processor 38 may integrate that information into one or more of the applications 14. In one illustrative approach, if the processor 38 identifies contact information, the processor 38 may integrate that contact information identified into the address book application. Alternatively, if the processor 38 identifies information regarding a new calendar appointment, the processor 38 incorporates the calendar appointment information into the calendar application.

Figure 4:
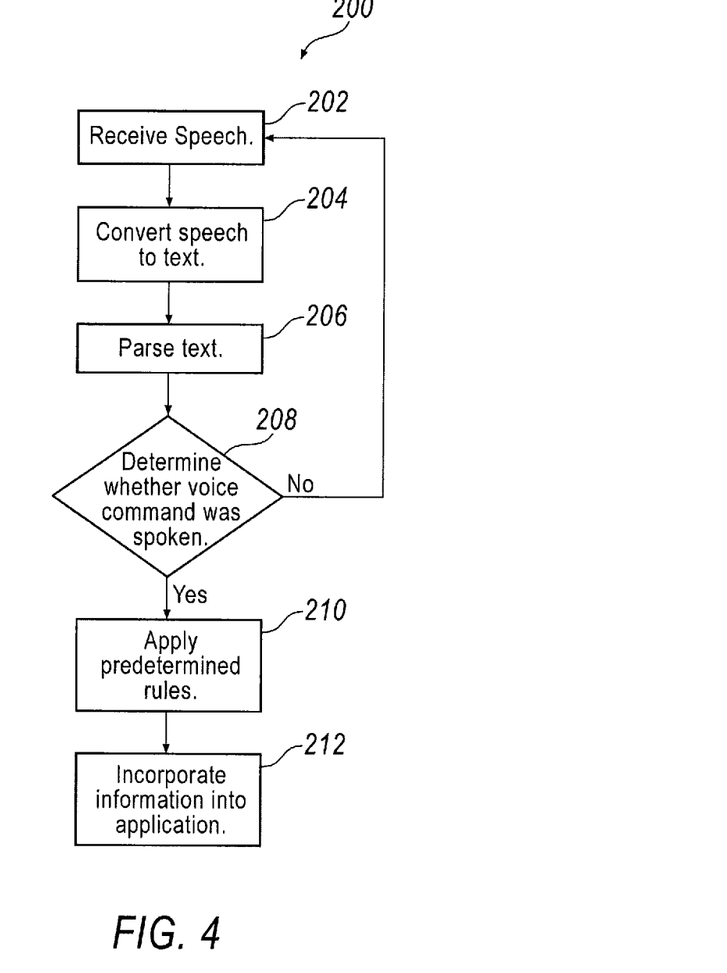
FIG. 4 illustrates another exemplary flowchart of a method executed by the integrator.

FIG. 4 illustrates another exemplary method 200 that may be implemented by the integrator 16 while the user is, for example, using the mobile device 12. In one exemplary implementation, the user may use the mobile device 12 as a telephone, and the method 200 may be implemented during a telephone conversation. The method 200 may include a step 202 of receiving speech from the user. The integrator 16 converts the speech to text at step 204 using the voice recognition module 36. The processor 38 may be configured to parse the text at step 206 and determine whether a voice command was spoken by the user at step 208. If not, the method 200 returns to step 202 to continue to receive speech and the method 200 repeats until a voice command is identified. Once the processor 38 identifies the voice command, the method 200 moves to step 210, where the processor 38 applies the predetermined rules associated with the voice command. By applying the predetermined rules, the processor 38 may then identify information from the user's speech, and incorporate the information into one or more applications 14, as illustrated at step 212. Accordingly, the integrator 16 may be configured to continuously listen for commands during telephone conversations or while the user is otherwise using the mobile device 12. This way, the integrator 16 may be configured to respond to the user's voice commands at any time, even if the user is using the telephone.

Several exemplary implementations of the system 10 previously discussed will now be described.

The mobile device 12 may receive information from the remote source, such as the remote database 20, and integrate that data into one or more of the applications 14. For example, the integrator 16 may be configured to access information stored in the remote database 20 in response to voice commands from the user and input the information from the remote database 20 into one or more of the applications 14. The integrator 16 may receive a voice command from the user. For example, the voice command may be received and identified by the voice recognition module 36. Once identified, the voice command may be used to indicate which predetermined rule the processor 38 may apply to identify the information. For example, a voice command instructing the integrator 16 to store contact information found in an email into an address book may cause the processor 38 to search for identifiers of contact information, such as names, addresses, telephone numbers, email addresses, etc. The processor 38 may identify names based on punctuation (e.g., two capitalized non-dictionary words in a row), addresses based on specific combinations of letters and numbers indicating a street name, city, state, and/or zip code, telephone numbers based on strings of 7 or 10 digits, and/or an email address using the "@" symbol or a top level domain such as ".com" or ".net". The integrator 16 may parse the contact information from, for example, an email stored in the remote database 20, and input that information into, for example, an address book entry or calendar appointment using the predetermined rules previously described. Any number of applications 22 may be hosted by the service provider and stored in one or more remote databases 20 accessible by the integrator 16. In addition, the integrator 16 may access the one or more remote databases 20 for hosted email, telephone service, calendar appointments, voice commands, voice mail, calendar matching services, navigation, text messaging, information about events important to the user, a telephone and address directory, account and payment information, and backup and restore options, among others.

In another exemplary implementation, the integrator 16 of the first mobile device 12 may be configured to access and/or retrieve information stored in the second mobile device 30, including information associated with one or more applications 32 of the second mobile device 30. In this exemplary implementation, the remote source includes the second mobile device 30. In response to a voice command, the integrator 16 may integrate information accessed from the second mobile device 30 into one or more applications 14 of the first mobile device 12. The integrator 16 may process the voice command as previously described. Further, the integrator may access one or more memory storage media 34 and the processor 38 may analyze the information retrieved from the one or more memory storage media 34 to identify relevant information by applying the rules identified by the voice command.

In one illustrative approach, the integrator 16 may be configured to synchronize and/or access information associated with the applications 26 of the personal computer 24, which may be the remote source. As in the previous approaches described, the processor 38 may be configured to communicate with the personal computer 24, including the applications 26, scan the information associated with the applications 26, and identify the relevant information based on the predetermined rules. In this illustrative approach, the predetermined rules may be selected in accordance with the voice command.

In another illustrative approach, the remote source may be the website 28, and the voice command from the user may instruct the integrator 16 to access the website 28 for the information. In response, the integrator 16 may scan the text, images, html, or other code of a website 28 to access and/or retrieve the desired information in response to the voice command. By way of example, if the voice command from the user requests information about an event, including dates and locations, the integrator 16, using the processor 38, may search the website 28 for indicators of dates, such as names of months and/or strings of numbers in date formats (e.g., 1/1/2009, Jan. 1, 2009, 1 Jan. 2009, etc.). The integrator 16 may also identify the location by searching for known city and state combinations or for a city names near the name or abbreviation of a state.

In one illustration, the automatic identification and integration of important information discussed during the telephone call may be triggered by specific verbal commands from the user of the first mobile device 12 (i.e., a first user) that are recognized by the integrator 16. Furthermore, the integrator 16 of the first mobile device 12 may be configured to analyze speech from a user of the second mobile device 30 (i.e., a second user) to identify the information to be stored in one or more of the applications 14 of the first mobile device 12. For example, as previously discussed, the voice recognition module 36 may capture the sounds spoken by the first and second users, convert the sound to text, and the processor 38 may analyze the text to identify important information. In one illustrative approach as previously discussed, the processor 38 may parse the text by applying the predetermined rules based on the voice command spoken by the first user.

For example, during a telephone call between the first user and the second user, the first user could state: "Let me make a note of this" or a similar command that is recognized by the integrator 16. The voice command may cause the integrator 16 to record, search for, and integrate the information stated by the second user during the phone call into one or more applications 14 in the first mobile device 12. For example, in response to the voice command, the integrator 16 may record the second user's speech, convert the speech to text, scan the text to identify a telephone number, store the telephone number in the address book, scan the text to identify a name, and store the name along with the telephone number stated by the second user. The integrator 16 may be configured to speak the identified information for confirmation by the first user. Moreover, the integrator 16 may be configured to receive a new command, such as the word "Done," after the second user has stated the necessary information.

The integrator 16 may further be configured to identify information discussed during a telephone call without being prompted by the first user. In this exemplary implementation, the integrator 16 constantly captures the speech, converts the speech to text, and keeps important information. Therefore, if contact information including a telephone number, for example, is discussed during the telephone call, after terminating the call, the first user may state a command such as "Call that number." Upon receiving this command, the integrator 16 may be configured to automatically dial the last phone number captured and identified during the previous conversation even though the first user did not explicitly command the integrator 16 to capture that information. Likewise, the integrator 16 may be configured to generate a follow-up list of names and telephone numbers based on contact information discussed during one or more previous telephone conversations either automatically or in response to the voice command. Thus, the information stated by the second user may be used to make a follow-up telephone call without requiring the first user to remember and/or write down the name and phone number. The integrator 16 may organize the information in the follow-up list in various ways, including reverse chronological order by date, alphabetical by first or last name, or any other criteria. Moreover, the integrator 16 may automatically implement any contact information discussed during a telephone conversation into the address book of the mobile device 12, whether prompted by the user or not.

During or after a telephone call, the integrator 16 may be further configured to store caller information, content of the call, time of the call, and notes about other events relating to the call in the remote database 20 or application 14 either automatically or in response to a voice command from the first user. This information may be used later for various purposes, including tracking the amount of time and other relevant billing and accounting information. Further, in an exemplary implementation where the integrator 16 records the entire telephone conversation and converts the conversation into text, the user may be able to view a transcript of the telephone conversation. For example, the transcript may be presented to the user as part of the call log or billing record on the service provider's website 28. Alternatively, the transcript may be presented to the user on the mobile device 12.

The integrator 16 may also be implemented with a voice mail program provided by the service provider and hosted on the remote database 20. For example, while the user is listening to voicemail, the user may say commands to alter playback of the voicemail messages, such as instructing the integrator 16 to speed up or slow down the voicemail message playback, allowing the user to skim or listen carefully to the messages. The user may command the integrator 16 to skip forward to the next message or to jump to a particular message stored in the user's voicemail based on the user's voice command. Also, the user may instruct the integrator 16 via voice command to delete the message or to store the message in an archives. The integrator 16 may further be configured to identify the number of the party who left the voicemail, and call the number in response to a voice command by the user. Moreover, the integrator 16 may be configured to suspend playback of the message and immediately call the party back upon the user's command. Additionally, the voice recognition module 36 may record the voicemail message and convert the message into text. The processor 38 may analyze the text to identify information in the voicemail. Accordingly, the integrator 16 may be configured to call a number mentioned by the calling party during the message. The integrator 16 may similarly be configured to control the user's review of text messages, speech-to-text printed voicemails, email, photos, videos, and/or web sites and social networks including dating or friendship sites.

The integrator 16 may further be configured to allow the user to defer calls to a later time either automatically or in response to a voice command. For example, the integrator 16 may be configured to intercept incoming telephone calls from a third party while the user is on the phone, in a meeting, or otherwise preoccupied. The integrator 16 may be configured to intercept the incoming call if the calendar indicates that the first user is busy or in response to the voice command from the first user. For example, the processor 38 may access the calendar application to determine when the user is unavailable. If unavailable, the processor 38 may disable incoming calls to the mobile device 12.

In one exemplary implementation, the integrator 16 may identify and communicate to the third party dates and/or times when the first user will become available for the third party to call back. The integrator 16 may further provide the third party with an option to select one of the dates and/or times the first user is available to return the call. For example, the processor 38 may determine from the calendar when the user is next available to call the third party back or so the third party can call back at that later time. The processor 38 may transmit that information to the voice synthesis module 40. The voice synthesis module 40 may then speak the determined date and/or time to the third party. The processor 38 may give the third party an opportunity to confirm the date and time to return the call. Moreover, the integrator 16 may be configured to update the user's calendar with the date and/or time selected and/or confirmed by the third party. The processor 38 may be configured to attach a voicemail or other note to the reminder in the user's calendar. Similarly, the integrator 16 may allow the third party to attach notes to specific appointments or address book entries of the first user. These notes may be used to add additional contact information, such as a new phone number or new address, or provide an agenda for an upcoming meeting.

When calls from unknown parties are received by the user, the integrator 16 may be configured to generate an address book entry with contact information, such as a phone number and caller ID information. The integrator 16 may further place a note in the new address book entry with a transcript or summary of the contents of the call or voicemail left by the unknown party. The user may then return the unknown party's call, if desired. If the unknown party calls again, the integrator 16 may place a new note in the entry or otherwise keep a record of the additional call.

Another voice command may cause the integrator 16 to tell the user the next available appointment time so the user can schedule additional appointments. For example, in response to the voice command, the processor 38 may access the calendar in the applications 14 of the mobile device 12, identify the next available appointment time by scanning the current appointments and looking for gaps in the appointments, and transmitting the next available appointment time to the voice synthesis module 40, which audibly communicates the next available appointment time to the user. This command may be executed, for example, by the first user during a conversation with the second user or while listening to voicemail messages. Instead of responding directly to a voice command, the voice recognition module 36 may listen for the first user and/or second user to request to schedule a follow-up date. At the end of the conversation, the voice recognition module 36 may transmit the agreed upon follow-up date to the processor 38, which creates a new appointment in the calendar application 14 of the mobile device 12. Moreover, the processor 38 may be configured to automatically send a message to the first user and/or the second user confirming the date, time, address, and/or telephone number of the follow-up conversation or appointment using one of the applications 14, such as the email application, the text messaging application, etc. The message may provide the first user and/or second user with an option to reschedule, provide additional information about the follow-up conversation or appointment (e.g., a new telephone number or address), or simply confirm that the first user and/or second user is available at the follow-up date, time, or telephone number. The processor 38 may identify that parties confirmed the follow-up appointment and add the follow-up appointment to the user's calendar. Further, the processor 38 may be configured to access and integrate the identified information into, for example, the calendar application 32 and/or the memory storage device 34 of the second mobile device 30 given the appropriate permission to do so from the first and/or second user.

The integrator 16 may be configured to respond to other voice commands than previously described from the first user while on a telephone call with the second user. In one illustration, the integrator 16 may be configured to forward contact information, ID information, or other information to the second user without the first user having to look up and/or repeat the information during the telephone call. For example, the voice recognition module 36 may receive speech from the first user and convert the speech to text. The processor 38 may parse the text to identify voice commands, and communicate with one or more of the applications 14, instructing the one or more applications 14 to send the requested information to the second user. The requested information may be received by the second user and stored directly in one or more applications 32, such as the calendar, address book, etc., on the second mobile device 30.

The integrator 16 described herein may be used with many types of mobile devices 12 such as cellular telephones, beepers, personal digital assistants (PDAs), etc. Further, the integrator 16 may be protected by various levels of security. For example, the integrator 16 may be configured to only allow authorized third parties to store and/or access information about the user, including the user's calendar, address book, etc.

One illustrative example of how the integrator 16 may be used is represented by the following hypothetical situation although the example is not intended to be limiting. Lee (e.g., the first user) receives a telephone call while driving. Hector (e.g., the second user) is calling and tells Lee that he wants Lee to contact Rita to discuss an emergency that just occurred. Lee states, "Let me get more information," which triggers the integrator 16 to start recording information from the call. Lee asks "What is Rita's contact information?" Hector replies, "Rita Rosario, 555-555-1212, rita at Long Branch Medical dot com." The integrator 16 automatically captures this information and adds a new contact in Lee's address book under the name Rita Rosario with phone number "(555) 555-1212" and email address "rita@longbranchmedical.com." Using the voice synthesis module 40, the integrator 16 may ask Lee or Hector to confirm the information. For example, the integrator 16 may ask to confirm whether "Rita" is a first name and "Rosario" is a last name. Alternatively, the integrator 16 may ask Lee or Hector to spell Rita's name or email address.

If Hector does not know Rita's contact information, Lee can command "Internet—Long Branch Medical dot com." In response the integrator 16 navigates to the Long Branch Medical website using a web browser application of the mobile device 12. Then, Lee may command "Get Rita Rosario's contact information," causing the processor 38 of the integrator 16 to scan the website for contact information, and in particular, Rita Rosario's contact information, using text recognition software and applying the predetermined rules. Once identified, the processor 38 stores the information from the website 28 in the address book, for example, of the mobile device 12. Alternatively, Hector could tell Lee that he will email him with Rita's contact information. Lee may command "Open email," causing the integrator 16 to access an email account hosted by a remote service provider. The integrator 16 may then access the remote applications 22 storing information in the remote database 20. For example, the processor 38 may then scan the text of Lee's email in the remote application 22 for Rita Rosario's contact information. Once Rita's information is obtained and stored in the address book of the mobile device 12, the next time Lee synchronizes the mobile device 12 with his personal computer 24, Rita's contact information is uploaded to the address book application 26 of the computer 24.

Lee hangs up the phone with Hector and calls Rita, but gets no answer. Lee may command "Calendar" into his phone, which triggers the integrator 16 to open Lee's calendar application. Lee commands, "Tell me today's schedule" and the integrator 16 reads "10:30 meeting with Medco, 1 PM meeting with . . . " using the voice synthesis module 33 until Lee interrupts with the command, "Postpone 10:30 meeting until tomorrow." The integrator 16 checks the Medco calendar and Lee's calendar for openings tomorrow and finds that both are available at 3:30. The integrator 16 then reschedules the appointment to 3:30 tomorrow, including sending confirmation messages to both Lee and the appropriate representative from Medco. Lee commands "Navigator," and the integrator 16 executes the navigator application of the mobile device 12. Lee commands "Reroute me to Long Branch Medical Center," and the integrator 16 provides Lee with verbal driving directions. Lee commands, "How much time to reach destination?" and hears the response, "13 minutes" from the integrator 16 using the voice synthesis module 33. Lee commands, "Voice message" and the integrator 16 prompts Lee for a recipient. Lee commands, "Rita Rosario." Upon another prompt from the integrator 16, Lee records a message indicating that he will be at Long Beach Medical Center in less than 15 minutes. When Lee commands "Done," the integrator 16 sends the message to Rita as a voicemail.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An apparatus comprising:
a plurality of applications; and
an integrator in communication with said plurality of applications and having a voice recognition module, said integrator configured to:
identify a voice command in at least one communication from at least one user,
identify a remote source of information identified in the at least one communication and referenced by the identified voice command, said remote source of information specifying information not included in the at least one communication, access said remote source of information to retrieve information requested by the identified voice command, and integrate the information from said remote source into at least one of said plurality of applications based on the identified voice command.

2. An apparatus as set forth in claim 1, wherein said voice recognition module is configured to analyze speech from the user and identify the at least one voice command based on the analyzed speech.

3. An apparatus as set forth in claim 1, wherein said integrator is configured to analyze speech and identify the information based on the analyzed speech.

4. An apparatus as set forth in claim 1, wherein said integrator is configured to retrieve the information from one of said plurality of applications and integrate the retrieved information into another of said plurality of applications.

5. An apparatus as set forth in claim 1, wherein said plurality of applications includes at least one of an email application, a calendar application, a global positioning system (GPS) application, a text messaging application, an address book application, a navigator application, a voice messaging application, a telephone application, a web browser, and a task list application.

6. An apparatus as set forth in claim 1, wherein the remote source includes a remote database and wherein said integrator is configured to integrate the information from the remote database into at least one of said plurality of applications based on the identified voice command.

7. An apparatus as set forth in claim 6, wherein the information is associated with a remote application and stored in said remote database.

8. An apparatus as set forth in claim 1, wherein the remote source includes a mobile device and wherein said integrator is configured to integrate the information from the mobile device into at least one of said plurality of applications based on the identified voice command.

9. An apparatus as set forth in claim 1, wherein said remote source referenced by the identified voice command specifies information to be integrated including at least a portion of a website, a hosted email, a calendar appointment, a telephone directory, and an address directory.

10. A system comprising:
a first mobile device having a plurality of first applications;
a remote source in communication with said first mobile device; and
wherein said first mobile device includes an integrator configured to:
identify a voice command in at least one communication of which a user of said first mobile device is a party,
identify a remote source of information identified in the at least one communication and referenced by the identified voice command, said remote source of information specifying information not included in the at least one communication,
access said remote source of information to retrieve information requested by the identified voice command, and
integrate the information from said remote source into at least one of said plurality of first applications based on the identified voice command.

11. A system as set forth in claim 10, wherein said integrator includes a voice capture module configured to capture speech from the user of said first mobile device.

12. A system as set forth in claim 10, wherein said remote source includes a second mobile device having a plurality of second applications, wherein said integrator is configured to capture speech from a user of said second mobile device and integrate information into at least one of said plurality of first applications based on the captured speech from said user of said second mobile device.

13. A system as set forth in claim 12, wherein said integrator is configured to integrate information from at least one of said plurality of second applications into at least one of said plurality of first applications based on the identified voice command.

14. A system as set forth in claim 10, wherein said remote source includes a remote database, wherein said integrator is configured to capture the information from said remote database and integrate the information into at least one of said plurality of first applications.

15. A system as set forth in claim 10, wherein said remote source referenced by the identified voice command specifies information to be integrated including at least a portion of a website, a hosted email, a calendar appointment, a telephone directory, and an address directory.

16. A method comprising:
analyzing speech from at least one communication of which a first user of a first mobile device is a party, the first mobile device having a plurality of first applications;
identifying a voice command in the at least one communication based on the analyzed speech using a voice recognition module;
identifying a remote source of information identified in the at least one communication and referenced by the identified voice command, said remote source of information specifying information not included in the at least one communication;
accessing said remote source of information to retrieve information requested by the identified voice command; and
incorporating the information from said remote source into at least one of a plurality of first applications based on the identified voice command.

17. A method as set forth in claim 16, wherein the remote source includes a second user of a second mobile device having a plurality of applications, and further comprising analyzing speech from the second user of the second mobile device.

18. A method as set forth in claim 17, further comprising identifying the information based on the analyzed speech from the second user.

19. A method as set forth in claim 17, further comprising retrieving information from one of said plurality of second applications based on the identified voice command.

20. A method as set forth in claim 19, further comprising integrating the retrieved information from one of the plurality of second applications into one of said plurality of first applications based on the identified voice command.

21. A method as set forth in claim 16, wherein the remote source includes a remote database, and further comprising accessing the information from a remote database based on the identified voice command.

22. A method as set forth in claim 21, further comprising integrating information from the remote database into at least one of the plurality of first applications.

23. A method as set forth in claim 16, further comprising referencing at least one of a website, a hosted email, a calendar appointment, a telephone directory, and an address directory as said remote source specifying information to be integrated.

* * * * *